(12) United States Patent
Griffin et al.

(10) Patent No.: US 8,760,404 B2
(45) Date of Patent: Jun. 24, 2014

(54) METHOD AND APPARATUS PERTAINING TO A TOUCH TYPING-FRIENDLY GRID-PATTERNED KEYBOARD

(75) Inventors: Jason Tyler Griffin, Kitchener (CA); Roman Rak, Waterloo (CA)

(73) Assignee: BlackBerry Limited, Waterloo (CA)

( * ) Notice: Subject to any disclaimer, the term of this patent is extended or adjusted under 35 U.S.C. 154(b) by 890 days.

(21) Appl. No.: 12/884,850

(22) Filed: Sep. 17, 2010

(65) Prior Publication Data

US 2012/0068932 A1    Mar. 22, 2012

(51) Int. Cl.
- *G09F 3/02* (2006.01)
- *G09G 5/00* (2006.01)
- *G06F 1/16* (2006.01)
- *H05K 5/00* (2006.01)
- *H05K 7/00* (2006.01)
- *B41J 5/00* (2006.01)

(52) U.S. Cl.
USPC ....... 345/168; 345/169; 361/679.08; 400/489

(58) Field of Classification Search
USPC ............... 345/156, 168, 169, 173; 340/407.1; 361/679.08–679.2, 679.56; 341/22–35; 708/142–145; D14/346; 455/575.1, 455/566; 400/487–490, 714, 472; 200/5 A; 84/433
See application file for complete search history.

(56) References Cited

U.S. PATENT DOCUMENTS

| | | | |
|---|---|---|---|
| 3,633,724 A | 1/1972 | Samuel | |
| 3,967,273 A | 6/1976 | Knowlton | |
| 4,029,915 A | 6/1977 | Ojima | |
| 4,566,001 A | 1/1986 | Moore et al. | |
| D293,241 S | 12/1987 | Wan et al. | |
| 4,891,777 A | 1/1990 | Lapeyre | |
| 5,059,048 A | 10/1991 | Sirkin | |

(Continued)

FOREIGN PATENT DOCUMENTS

| | | |
|---|---|---|
| EP | 0490712 A1 | 10/1991 |
| EP | 1862883 A1 | 12/2007 |

(Continued)

OTHER PUBLICATIONS

"PDA Phone" HTC User Manual, retrieved from the Internet: http://member.america.htc.com/download/web_materials/Manual/HTC_TyTN_II/070820_TyTNII_HTC_English_Manual.pdf; Sep. 30, 2007; 262 pages.

(Continued)

*Primary Examiner* — Dwayne Bost
*Assistant Examiner* — Darlene M Ritchie
(74) *Attorney, Agent, or Firm* — Fitch, Even, Tabin & Flannery LLP

(57) ABSTRACT

A keyboard can be comprised of a plurality of alphabetic keys that are disposed in an evenly-spaced grid pattern with respect to one another. In any event, these keys have keycaps configured to comport with touch typing as with a keyboard having a plurality of alphabetic keys that are disposed in an offset pattern (such as the classic QWERTY offset-pattern typewriter-styled keyboard). By one approach, these keycaps can have keycaps having bilaterally-nonsymmetrical tactile features that at least substantially match standard touch-typing finger positions. By one approach these tactile features can comprise an indentation. If desired, these keycaps can share a same form factor. In such a case, some of the keycaps for the alphabetic keys can be disposed on the keyboard at a 180 degree rotation as compared to others of the alphabetic character keycaps.

15 Claims, 3 Drawing Sheets

(56) References Cited

U.S. PATENT DOCUMENTS

| | | | |
|---|---|---|---|
| 5,062,070 A | 10/1991 | Lapeyre | |
| 5,288,158 A | 2/1994 | Matias | |
| 5,360,280 A | 11/1994 | Camacho et al. | |
| 5,367,298 A | 11/1994 | Axthelm | |
| 5,515,763 A | 5/1996 | Vandervoort | |
| 5,598,527 A | 1/1997 | Debrus et al. | |
| 5,646,648 A * | 7/1997 | Bertram | 345/168 |
| 5,659,307 A | 8/1997 | Karidis et al. | |
| 5,689,253 A | 11/1997 | Hargreaves et al. | |
| 5,700,097 A | 12/1997 | Kuhlenschmidt | |
| 5,729,221 A | 3/1998 | Krolopp et al. | |
| 5,841,374 A | 11/1998 | Abraham | |
| 5,995,026 A | 11/1999 | Sellers | |
| 6,005,496 A | 12/1999 | Hargreaves et al. | |
| 6,102,594 A | 8/2000 | Strøm | |
| 6,259,044 B1 | 7/2001 | Paratore et al. | |
| 6,310,608 B1 | 10/2001 | Kaply et al. | |
| 6,333,734 B1 | 12/2001 | Rein | |
| D467,932 S | 12/2002 | Jones | |
| D472,551 S | 4/2003 | Griffin | |
| D480,722 S | 10/2003 | Griffin | |
| 6,630,924 B1 | 10/2003 | Peck | |
| D482,551 S | 11/2003 | Burke | |
| 6,646,226 B1 | 11/2003 | Reitz | |
| 6,774,819 B1 | 8/2004 | Falconer | |
| 6,919,879 B2 | 7/2005 | Griffin et al. | |
| 6,940,490 B1 * | 9/2005 | Kim et al. | 345/168 |
| D525,980 S | 8/2006 | Wang et al. | |
| 7,202,853 B2 | 4/2007 | Ng et al. | |
| 7,250,938 B2 | 7/2007 | Kirkland et al. | |
| 7,256,768 B2 | 8/2007 | Bathiche | |
| 7,356,361 B1 | 4/2008 | Hawkins et al. | |
| 7,394,030 B2 * | 7/2008 | Yurochko et al. | 200/5 A |
| 7,439,959 B2 | 10/2008 | Griffin et al. | |
| 7,479,947 B2 | 1/2009 | Pihlaja | |
| 7,561,685 B2 | 7/2009 | Griffin | |
| 7,658,561 B2 | 2/2010 | Vuong | |
| 7,663,602 B2 * | 2/2010 | Jones et al. | 345/168 |
| 7,733,330 B2 | 6/2010 | Griffin et al. | |
| 7,759,590 B2 | 7/2010 | Yurochko et al. | |
| 7,928,963 B2 * | 4/2011 | Chang et al. | 345/169 |
| 8,100,594 B2 * | 1/2012 | Chaumont et al. | 400/472 |
| 8,339,782 B2 * | 12/2012 | Song | 361/679.56 |
| 8,362,371 B2 * | 1/2013 | Chen | 200/5 A |
| 2002/0025837 A1 * | 2/2002 | Levy | 455/566 |
| 2003/0002910 A1 | 1/2003 | Jeffries et al. | |
| 2003/0108375 A1 | 6/2003 | Nichol et al. | |
| 2003/0206761 A1 | 11/2003 | Emerson | |
| 2004/0229663 A1 | 11/2004 | Tosey et al. | |
| 2005/0062619 A1 | 3/2005 | Jellicoe | |
| 2005/0068337 A1 | 3/2005 | Duarte et al. | |
| 2005/0264521 A1 | 12/2005 | Liu et al. | |
| 2007/0247429 A1 | 10/2007 | Westerman | |
| 2008/0081505 A1 | 4/2008 | Ou et al. | |
| 2008/0143679 A1 * | 6/2008 | Harmon et al. | 345/173 |
| 2009/0303187 A1 * | 12/2009 | Pallakoff | 345/169 |
| 2010/0040400 A1 * | 2/2010 | Hirsch | 400/489 |
| 2010/0105438 A1 | 4/2010 | Wykes et al. | |
| 2010/0171700 A1 | 7/2010 | Sharan et al. | |
| 2012/0306762 A1 * | 12/2012 | Leung et al. | 345/169 |

FOREIGN PATENT DOCUMENTS

| | | |
|---|---|---|
| EP | 2194437 A1 | 6/2010 |
| WO | 0108131 A1 | 2/2001 |
| WO | 03049077 A1 | 6/2003 |
| WO | 2006099150 A2 | 9/2006 |
| WO | 2006130747 A2 | 12/2006 |
| WO | 2007013095 A2 | 2/2007 |
| WO | 2007118056 A1 | 10/2007 |
| WO | 2007143814 A1 | 12/2007 |
| WO | 2008007850 A1 | 1/2008 |

OTHER PUBLICATIONS

EP Search Report from related EP Application No. 08170997.4; dated Apr. 2, 2009; 11 pages.

Extended European Search Report from related EP Application No. 10177483.4; May 12, 2011; 7 pages.

* cited by examiner

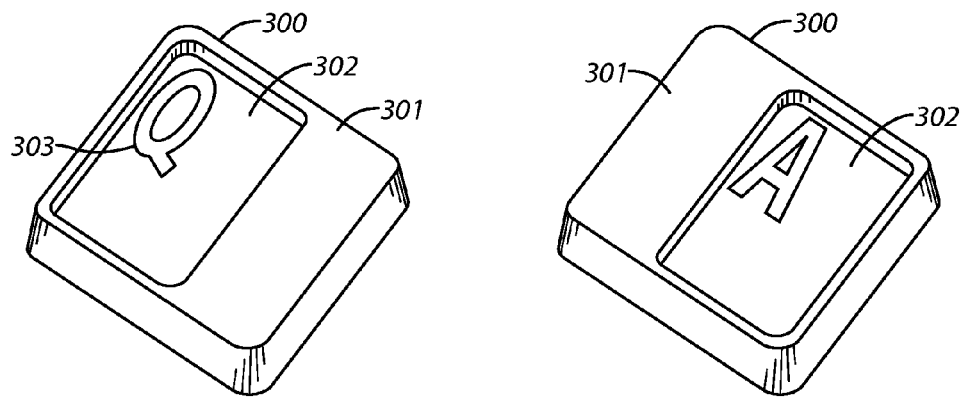
FIG. 3  FIG. 4
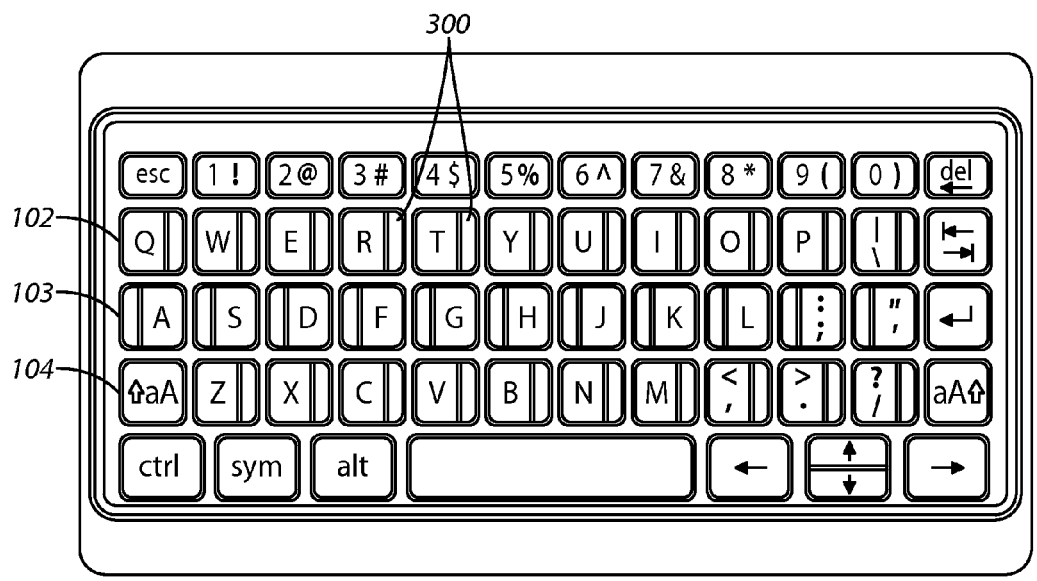
FIG. 5

METHOD AND APPARATUS PERTAINING TO A TOUCH TYPING-FRIENDLY GRID-PATTERNED KEYBOARD

TECHNICAL FIELD

This disclosure relates generally to keyboards.

BACKGROUND

Keyboards are well known in the art. This includes keyboards having a plurality of alphabetic keys such as the classic so-called QWERTY keyboard. The latter typically have keys disposed in a characteristic offset pattern that dates back to the 1800's and represents a mechanical layout for typewriter keys that minimized typebar collisions. Though such a need no longer persists (as modern keyboards, of course, lack typebars) modern keyboards typically still employ that same characteristic offset pattern.

This is largely because modern typists learn, to a lesser or a greater extent, to touch type on traditional offset-pattern keyboards; that is, to type without directly viewing the keys. Touch typing comprises, in considerable part, the development of muscle memory regarding the proper location of at least the alphabetic keys. And once a person has developed this muscle memory they typically have little or no inclination to replace or supplement that skill and experience with something new simply to make use of a differently-configured keyboard. And so it goes—to a very large extent we can be said to use and prefer offset-pattern keyboards because we initially learn to type using offset-pattern keyboards. For many application settings such a state of being is fine. Occasional alternative approaches for keyboard layout (such as the Dvorak keyboard) appear from time to time but the classic QWERTY offset-pattern keyboard satisfies the needs of most users.

Small keyboards, such as the keyboards on many so-called smartphones, are a noted exception and often employ instead an evenly-spaced grid pattern. This choice has not met with undue user dissatisfaction, likely because these keyboards are so small that the user cannot employ their offset pattern-based touch-typing skills (instead the typical user employs their thumbs to interact with the keyboard). New medium-sized products (such as netbooks) are appearing, however, that present a conundrum in these regards. The keyboards for these devices are large enough to physically accommodate touch typing but are small enough to make it challenging to provide usefully-sized and positioned keys to comport with such touch typing.

BRIEF DESCRIPTION OF THE DRAWINGS

FIG. 3 comprises a perspective view as configured in accordance with various embodiments of the present disclosure;

FIG. 4 comprises a perspective view as configured in accordance with various embodiments of the present disclosure;

FIG. 5 comprises a top plan view as configured in accordance with various embodiments of the present disclosure;

Elements in these figures are generally drawn to a relative scale. Common but well-understood elements that are useful or necessary in a commercially feasible embodiment may not be depicted in order to facilitate a less obstructed view of these various embodiments of the present disclosure. Certain actions or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to many of these various embodiments, a keyboard can be comprised of a plurality of alphabetic keys that are disposed in an evenly-spaced grid pattern with respect to one another. In any event, these keys have keycaps configured to comport with touch typing as with a keyboard having a plurality of alphabetic keys that are disposed in an offset pattern (such as the classic QWERTY offset-pattern typewriter-styled keyboard). By one approach, these keys can have keycaps having bilaterally-nonsymmetrical tactile features that at least substantially match standard touch-typing finger positions.

By one approach these tactile features can comprise an indentation. If desired, these keycaps can share a same form factor. In such a case, some of the keycaps for the alphabetic keys can be disposed on the keyboard at a 180 degree rotation as compared to others of the alphabetic character keycaps.

So configured, these teachings permit use of an evenly-spaced grid pattern keyboard in application settings where such is desired (to serve, for example, particular functional or aesthetic purposes). At the same time, however, these teachings will permit a touch typist to make ordinary and traditional use of such a keyboard notwithstanding that the keyboard is not configured in an offset pattern such as the traditional typewriter-style offset pattern. In particular, the touch typist's muscle memory will interact naturally and correctly with such a keyboard notwithstanding initial appearances to the contrary.

These teachings can be realized in highly cost-effective ways if desired. It is possible, for example, to use the same keycap form factor for all of the alphabetic keys notwithstanding the selective and sometimes different positioning of each keycap's bilaterally-nonsymmetrical tactile feature.

Figure 1:
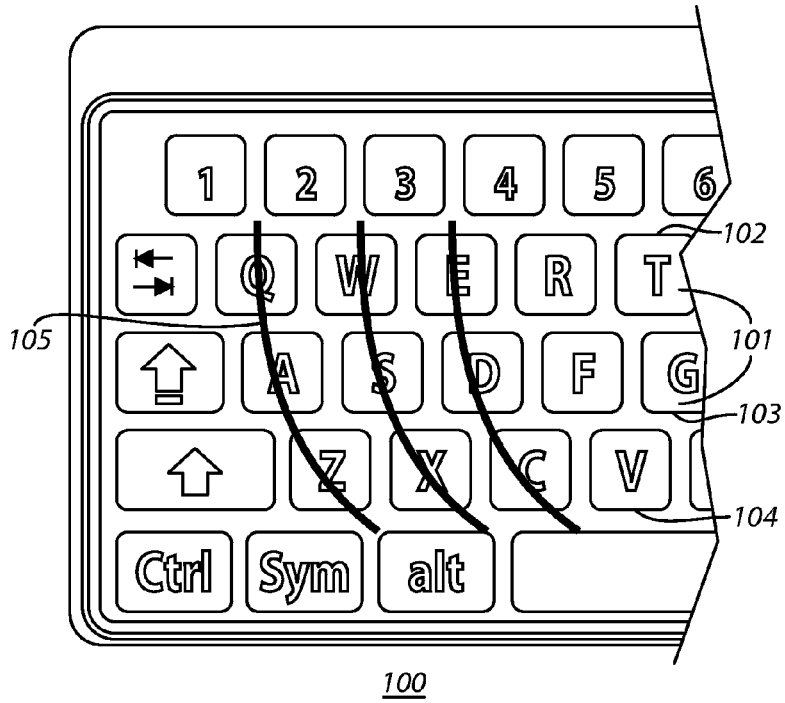
FIG. 1 comprises a top plan detail view as configured in accordance with the prior art.

These and other benefits may become clearer upon making a thorough review and study of the following detailed description. Referring now to the drawings, and in particular to FIG. 1, it may be helpful to first provide an example of a prior art keyboard 100 that employs an offset pattern for the keys 101. In this typical example there are rows of alphabetic keys. More specifically, this keyboard 100 has a first such row 102, a second such row 103, and a third such row 104. The alphabetic keys 101, in turn, are viewed as being "offset" because the columns formed by such rows are not coaxially vertically aligned. Instead, and as represented by the curved lines denoted by reference numeral 105, the keys 101 in these columns are vertically offset from one another.

A touch typist, whose muscle memory presumes such an offset pattern, will therefore "know" where a specific key is in each of these rows in a way that accounts for and relies upon such offsets. Accordingly, a touch typist utilizing a keyboard that does not employ such an offset pattern will typically not properly locate all of the keys with their fingers (without looking) because the location of at least some of the keys will not accord with their muscle memory in these regards.

Figure 2:
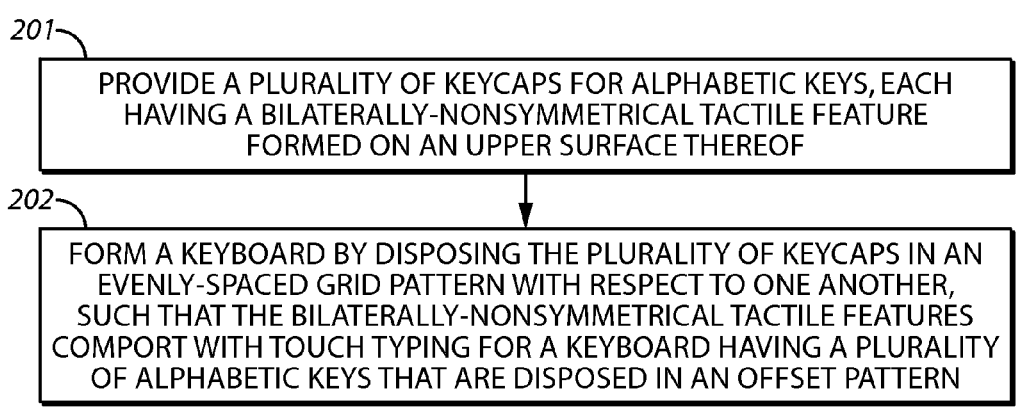
FIG. 2 comprises a flow diagram as configured in accordance with various embodiments of the present disclosure.

Referring now to FIG. 2, an illustrative process 200 that is compatible with many of these teachings will now be presented. Step 201 of this process 200 provides a plurality of keycaps for alphabetical keys. Illustrative but non-limiting examples in these regards are shown in FIGS. 3 and 4. By one approach, these alphabetic keycaps 300 have an eccentric tactile feature ("eccentric" in that the tactile feature is not centrally located on the keycap 300 and "tactile" in that the feature is discernable to a typist via their sense of feel in their fingertips).

In these particular examples, and for the sake of illustration and not by way of limitation, this eccentric tactile feature comprises a bilaterally-nonsymmetrical tactile feature in the form of an indentation 302 on the upper surface 301 of the kepcap 300. By one approach this indentation 302 is sufficiently deep to permit its detection by sense of feel. Other haptically-sensible configurations are possible, of course. As further examples in these regards, and again without intending any limitations, this eccentric tactile feature could comprise any of a plurality of small bumps, a raised area, a plurality of ridge lines, a different material having a different feel from the remainder of the keycap's upper surface 301, and so forth. These teachings will also accommodate using combinations of various differing tactile elements to form, in the aggregate, the eccentric tactile feature.

If desired, these keycaps 300 can have a corresponding alphabetic character 303 formed thereon. By one approach this alphabetic character 303 can be disposed within the eccentric tactile feature (for example, by being centrally disposed therein). These teachings will readily accommodate any approach of choice in these regards. For example, but again without intending any particular limitations in these regards, these alphabetic characters 303 can be integrally formed as part of the keycap 300 (using, for example, a molding process to form the keycap 300), or can be printed on the kepcap 300 or placed on the kepcap 300 as, for example, a sticker or decal. These and other techniques are well known in the art. As the present teachings are not particularly sensitive to any particular selection in these regards, for the sake of brevity further elaboration here will not be provided.

Although these keycaps 300 have an eccentric tactile feature, and although this eccentric tactile feature serves a particular purpose as shown below, by one approach a single keycap form factor will suffice for all of the alphabetic keys on a given keyboard if desired. In particular, some of the keycaps can make use of such a keycap 300 in a first orientation as shown in FIG. 3 (where the eccentricity favors the left side of the keycap 300) while others of the keycaps can make use of such a keycap 300 in a second orientation as shown in FIG. 4 (where the keycap 300 has been rotated 180 degrees as compared to the keycap 300 of FIG. 3 and where the eccentricity now favors the right side of the keycap 300). Such an approach can introduce a favorable economy of scale that contributes to reduced costs of manufacturing a keyboard using such keycaps 300.

Referring again to FIG. 2, step 202 of this process 200 then provides for forming a keyboard by disposing this plurality of keycaps 300 in an evenly-spaced grid pattern with respect to one another. FIG. 5 presents an illustrative example in these regards. In this example, the keyboard 500 has rows of keycaps 300 including a first, second, and third row of alphabetic keycaps (as denoted by reference numerals 102, 103, and 104, respectively). Pursuant to the aforementioned evenly-spaced grid pattern the corresponding columns of keycaps 300 are coaxially vertically aligned. This, of course, greatly differentiates the physical layout of these keycaps 300 as compared to a keyboard that employs an offset pattern.

In this illustrative example the keycaps 300 of the first row 102 and the third row 104 all have their bilaterally-nonsymmetrical tactile feature oriented towards the left. The keycaps 300 of the second row 103, however, all have their bilaterally-nonsymmetrical tactile feature oriented towards the right. By one approach, as noted above, this can comprise rotating the keycaps comprising the second row 103 180 degrees as compared to the keycaps of the first and third rows 102 and 104. So configured, these bilaterally-nonsymmetrical tactile features will comport with the expectations of a typical touch typist. That is to say, the relative location of these bilaterally-nonsymmetrical tactile features comport with touch typing muscle memory as corresponds to a keyboard having its alphabetic keys disposed in an offset pattern notwithstanding that this keyboard's alphabetic keys are not disposed in an offset pattern.

Figure 6:
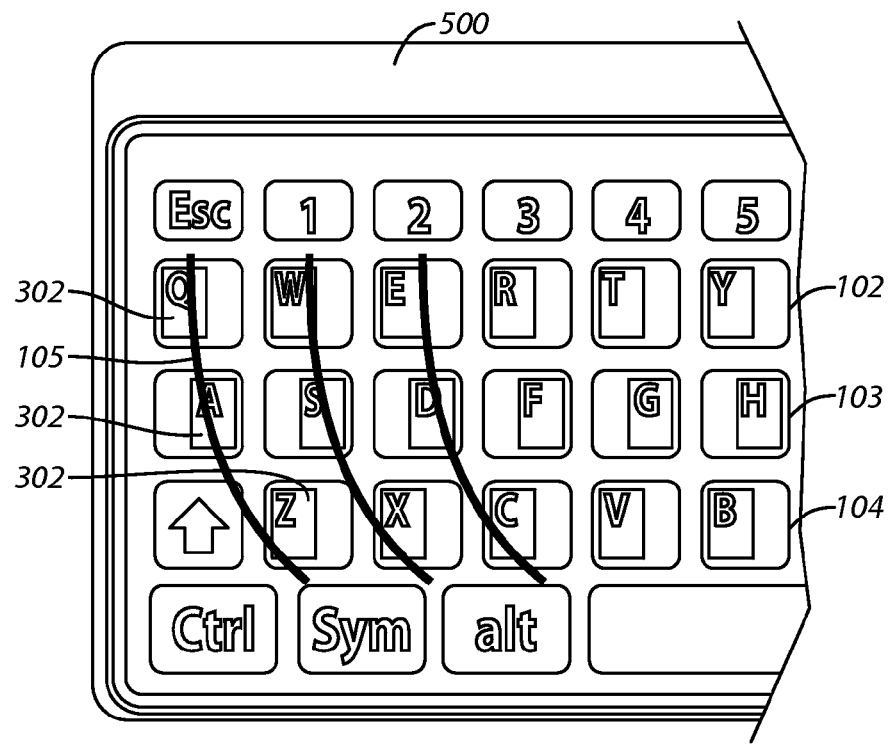
FIG. 6 comprises a top plan detail view as configured in accordance with various embodiments of the present disclosure.

This point may perhaps be better appreciated upon referencing FIG. 6. In particular, here it can be seen that a same curve 105 as one can derive for a typical typewriter-style offset pattern (see FIG. 1 described above) is derived here with respect to the indented areas 302 on the keycaps 300. As these indented areas 302 are detectable by the typist's fingers, these keycaps 300 inherently feel right to the typist and readily accommodate the typist's muscle memory that accords with an offset-pattern keyboard.

In the examples described above all of the alphabetic keys have a keycap that includes an eccentric tactile feature. Other possibilities exist, however. As one example, the very important (to a traditional touch typist) "F" and "J" keys may be the only kepcaps to include such a feature. As another example, the so-called home keys (i.e., the "A," "S," "D," "F," "J," "K," "L," and ";" keys) may be the only keycaps to include such a feature. Generally speaking, however, for many application settings it may be particularly useful to so configure all of the alphabetic keys such that the complete alphabet is so characterized.

These teachings therefore permit a keyboard to utilize an evenly-spaced grid pattern without frustrating traditional touch typists who seek to leverage their muscle memory as pertains to offset-pattern keyboards. This, in turn, permits the use of a wider range of differently-sized touch-typing friendly keyboards than one ordinarily associates with offset-pattern keyboards. In particular, smaller keyboards can now serve in these regards than has ordinarily been the case.

Figure 7:
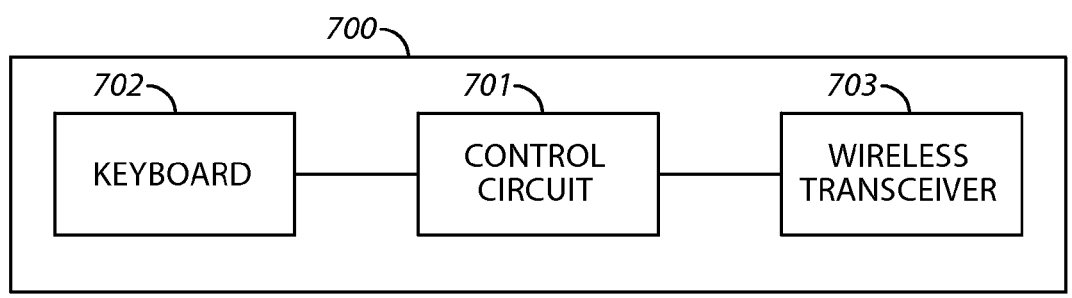
FIG. 7 comprises a block diagram as configured in accordance with various embodiments of the present disclosure.

The above-described processes are readily enabled using any of a wide variety of available, readily configured platforms. FIG. 7 provides one simple illustrative example in these regards. In this example, a so-called netbook 700 can comprise a control circuit 701 (such as a programmable microprocessor) that operably couples to such a keyboard 702 and a wireless transceiver 703 (such as a Bluetooth-compatible transceiver, an 802.11 family-compatible transceiver, a wide-area transceiver such as a cellular telephony-styled transceiver, and so forth). Though netbooks tend towards smaller (than traditional laptops) form factors, these teachings permit the use of a keyboard that will better accommodate the space limitations of such a netbook (by using, for example, an evenly-spaced grid pattern for at least the alphabetic keys of the keyboard) while preserving the natural and inherent ability of the keyboard 702 to comport with the muscle memory of a touch typist who learned their touch typing with an offset-pattern keyboard.

These teachings can be readily leveraged in favor of a wide variety of differently sized and purposed platforms. It will also be appreciated that these teachings can be easily scaled to similarly accommodate muscle memory skills for a variety of offset-pattern keyboards beyond the traditional typewriter-style offset pattern.

Those skilled in the art will recognize that a wide variety of modifications, alterations, and combinations can be made with respect to the above described embodiments without departing from the spirit and scope of the present disclosure, and that such modifications, alterations, and combinations are to be viewed as being within the ambit of the inventive concept.

We claim:

1. An apparatus comprising:
a keyboard comprising a plurality of alphabetic keys that are disposed in an evenly-spaced grid pattern with respect to one another, and wherein the alphabetic keys have keycaps that are provided with bilaterally-nonsymmetrical tactile features that are horizontally offset from one another from one row of the alphabetic keys to the next to thereby yield a curved configuration of the bilaterally-nonsymmetrical tactile features that substantially matches standard touch-typing finger positions, wherein some of the keycaps are disposed in a first orientation and some of the keycaps are disposed in a second orientation that is rotated 180 degrees with respect to the first orientation such that all of the keycaps that are in a first and third row are in the first orientation and all of the keycaps in a second row are in the second orientation.

2. The apparatus of claim 1 wherein the keycaps are configured to comport with touch typing by, at least in part, providing an upper surface of the keycaps with an eccentric tactile feature.

3. The apparatus of claim 2 wherein the eccentric tactile feature comprises an indentation.

4. The apparatus of claim 1 further comprising:
a wireless transceiver;
a control circuit operably coupled to the wireless transceiver and to the keyboard.

5. The apparatus of claim 1 wherein the alphabetic keys comprise, at least in part, an "F" key and a "J" key.

6. The apparatus of claim 5 wherein the alphabetic keys comprise, at least in part, a home row of alphabetic keys.

7. The apparatus of claim 6 wherein the alphabetic keys represent a complete alphabet.

8. The apparatus of claim 1 wherein the bilaterally-nonsymmetrical tactile features comprise indentations in an upper surface of the keycaps.

9. The apparatus of claim 1 wherein alphabetic characters that correspond to each of the alphabetic keys are disposed within the bilaterally-nonsymmetrical tactile features.

10. The apparatus of claim 9 wherein the alphabetic characters that correspond to each of the alphabetic keys are centrally disposed within the bilaterally-nonsymmetrical tactile features.

11. The apparatus of claim 1 wherein the keycaps for the alphabetic keys have a same form factor.

12. The apparatus of claim 11 wherein some of the keycaps for the alphabetic keys are disposed on the keyboard at a 180 degree rotation as compared to others of the keycaps for the alphabetic keys.

13. The apparatus of claim 1 further comprising:
a wireless transceiver;
a control circuit operably coupled to the wireless transceiver and to the keyboard.

14. A method comprising:
Providing a plurality of keycaps for alphabetic keys, each having a bilaterally-nonsymmetrical tactile feature formed on an upper surface thereof;
Forming a keyboard by disposing the plurality of keycaps in an evenly-spaced grid pattern with respect to one another, such that the bilaterally-nonsymmetrical tactile features are horizontally offset from one another from one row of the alphabetic keys to the next to thereby yield a curved configuration of the bilaterally-nonsymmetrical tactile features that substantially matches standard touch-typing finger positions, wherein some of the keycaps are disposed in a first orientation and some of the keycaps are disposed in a second orientation that is rotated 180 degrees with respect to the first orientation and wherein all of the keycaps that are in a first and third row are in the first orientation and all of the keycaps in a second row are in the second orientation.

15. The method of claim 14 wherein disposing the plurality of keycaps in an evenly-spaced grid pattern comprises disposing the second row between the first and third row.

* * * * *